United States Patent [19]
Altmejd

[11] Patent Number: 4,719,401
[45] Date of Patent: Jan. 12, 1988

[54] ZENER DIODE LOOPING ELEMENT FOR PROTECTING A BATTERY CELL

[75] Inventor: Morrie Altmejd, Toronto, Canada

[73] Assignee: Powerplex Technologies, Inc., Downsville, Canada

[21] Appl. No.: 804,467

[22] Filed: Dec. 4, 1985

[51] Int. Cl.4 .............................................. H02J 7/00
[52] U.S. Cl. .......................................... 320/13; 320/6;
320/18; 361/124
[58] Field of Search ................... 320/2, 13, 15, 18, 6;
361/56, 124, 57, 91, 103, 104, 111

[56] References Cited

U.S. PATENT DOCUMENTS

| | | | |
|---|---|---|---|
| 2,624,033 | 12/1952 | Jacquier | 320/18 X |
| 3,102,222 | 8/1963 | Harmer | 320/15 X |
| 3,148,322 | 9/1964 | Booe et al. | 320/43 |
| 3,343,058 | 9/1967 | Deschamps et al. | 320/40 X |
| 3,393,355 | 7/1968 | Whoriskey et al. | 320/18 |
| 3,402,325 | 9/1968 | Minks | 361/56 |
| 3,476,979 | 11/1969 | Stumpe et al. | 361/56 X |
| 4,061,955 | 12/1977 | Thomas et al. | 320/15 X |
| 4,238,721 | 12/1980 | DeLuca | 320/18 |
| 4,303,877 | 12/1981 | Meinhold | 320/18 X |

FOREIGN PATENT DOCUMENTS

| | | |
|---|---|---|
| 0123126 | 3/1984 | European Pat. Off. . |
| 0170883 | 12/1986 | European Pat. Off. . |
| 2360203 | 2/1978 | France . |
| WO85/04045 | 2/1985 | PCT Int'l Appl. . |
| 936969 | 9/1963 | United Kingdom . |

OTHER PUBLICATIONS

Motorola, Silicon Rectifier Handbook, p. 10-1, 1966.

Primary Examiner—Patrick R. Salce
Assistant Examiner—Anita M. Ault
Attorney, Agent, or Firm—Cushman, Darby & Cushman

[57] ABSTRACT

A special zener diode is disclosed which is shunted across each cell in a series connected string of battery cells. In response to a cell failure which causes a cell to open circuit, all battery current is routed through the zener diode looping element. This current causes a permanent state change of the looping element thereby causing the looping element to become a permanent short circuit. Thereby, the failed cell is effectively removed from the circuit. Another embodiment is disclosed whereby the zener diodes are used to ensure uniform full charge among all of the cells in the battery. The zener diodes are chosen to have a breakdown voltage slightly higher than the optimal maximum battery voltage. A special charger is used which lowers the charging rate when the zener breakdown voltage is approached, so that the zener will not be destroyed from excess current during charging.

21 Claims, 11 Drawing Figures

ZENER DIODE LOOPING ELEMENT FOR PROTECTING A BATTERY CELL

CROSS-REFERENCE TO RELATED APPLICATIONS

This application is related to the application entitled "A Silicon Diode Looping Element for Protecting a Battery Cell" filed this same day, U.S. patent Ser. No. 804,468, with a same inventor and commonly assigned.

FIELD OF THE INVENTION

This invention relates generally to battery technology. More specifically, this invention relates to a zener diode element which is shunted across individual cells of a battery to equalize charge between the various cells of a battery, and to shunt across any failed cells which occur in the battery. This element finds a special application in high temperature batteries, such as sodium sulfur type.

BACKGROUND OF THE INVENTION

Batteries store energy in chemical form. A rechargeable battery is a type of battery capable of transmuting electrical charge by storing it in the form of a reversible chemical reaction. When the battery is subsequently placed across a load, this reversible reaction reverses from the direction in the storage mode, thereby producing electrical energy for use by the load.

There are many popular types of rechargeable batteries. Perhaps the most popular are the nickel cadmium and lead acid types. These batteries generally operate over a usual range of ambient temperatures, and store a relatively small amount of charge.

Other types of batteries, which are presently becoming more popular due to relatively high amount of energy storage, are generically labeled as "high temperature batteries". Examples of this kind of batteries are electrochemical storage cells of the alkali metal and chalcogen type, sodium sulfur type, and lithium or lithium fluoride type. Operation of a high temperature battery requires it to be stored in an ambient environment with a temperature of betweeen 300° C. and 500° C. Thus, although these high temperature batteries can store increased amounts of charge, they must be used under difficult operating conditions (very high temperatures). To compound this problem, typically the reliability of these batteries is reduced by any heat cycling of the batteries between ambient temperature and their proper operating temperature. Thus, when using these batteries, continuous reliable operation is highly advantageous. The importance of trouble free operation is made doubly evident when it is considered that even if servicing of these batteries is desired, the process requires a significant amount of cooling time before the parts of the batteries would be cool enough to be handled by service personnel. During this cooling time, the batteries will necessarily be out of service.

Single battery cells are generally available in the range of approximately a half a volt to five volts, with the specific voltage of the battery cell depending on properties of the chemical reaction which is occurring within the battery cell. Thus, to obtain a battery which has a higher voltage than this relatively low cell voltage, typically a plurality of cells are placed in series, to thereby add the respective cell voltages to obtain a resultant higher voltage. Sodium sulfur batteries, for example, have a cell voltage of approximately two volts. Thus, should a battery voltage of 48 volts be required, 24 of the cells would be required to be connected in series. However, this connection in series presents some problems with respect to operational reliability and to maximum battery efficiency.

One such problem is due to the fact that when a battery cell fails it will typically fail into the open circuit state. This failure into open circuit state would effectively destroy the utilitarianism of the entire battery. Thus, in the example given above of a 48-volt battery, a single cell of the 24 cells in the battery malfunctioning into an open circuit state would necessitate the replacement or repair of the entire battery. As such, it would be advantageous in the art to have a device which obviates this problem.

An early attempt at such a device is described in U.S. Pat. No. 2,624,033. This patent teaches placing individual diodes in parallel across each series connected cell. These diodes are placed so that normally a charged cell would reverse bias these diodes. However, when a cell either open circuits or is discharged close enough to zero volts, the related diode shunt across the particular cell will be forward biased. Thereby the particular cell will be effectively shorted out. The patented system has the disadvantage that in order for the diode to shunt across the particular cell, the diode must be forward biased and operating correctly. There is no permanent state change in the diode, and thus a failure of the diode would cause the battery to malfunction.

Another proposed solution to the problem is suggested in the disclosure of U.S. Pat. No. 3,102,222. This patent teaches a device which is specialized to high temperature catalytic battery cells, whereby by sensing the temperature of a particular battery cell, the condition of that particular cell can be approximated according to a predetermined algorithm. A switch 1 is normally closed and connected in series between the battery and the charging unit. The switch 1 is arranged to open when the temperature of the catalyst used in the battery reaches a predetermined value. The patent does not teach a method of shunting across individual cells in response to cell failure. Furthermore, this technique would only be applicable to high temperature battery cells.

A further proposed solution to the problem is taught in U.S. Pat. No. 4,303,877, the disclosure of which is expressly incorporated herein by reference. This patent teaches a plurality of battery cells of the electrochemical storage type in series. Shunted across each such cell is a temperature sensitive switch and a diode in series with heating device. In one preferred embodiment, when a cell fails into the open circuit state, the diode is forward biased thereby energizing the heating element. This heating element then heats the temperature sensitive switch, which permanently changes position—similar to a fusible link. This temperature sensitive switch thus permanently changes position in response to a cell of the battery failing. The failed cell is thereby effectively shorted across. While the general technique used is extremely effective, a disadvantage exists in the relative complexity and impracticality of the many components being used within a high temperature battery. The present invention overcomes all these problems by a single component performing all these functions as described herein.

Another problem which tends to lower the reliability of batteries is uneven cell charging. For reasons known to those skilled in the art, some battery cells will require and/or give up their charge at a more rapid rate than other cells. Also, different batteries have uneven leakage currents, thereby yielding a variable shelf life. Thus, at any given time of charge in the prior art typical charging apparatus, all battery cells would not be at the same charge level. However, it is particularly advantageous to charge all battery cells to substantially the same charge—that same charge being their full possible charge. However, a countervailing consideration is that there are many problems associated with overcharging a battery cell. For instance, in the nickel cadmium and lead acid type of battery cells overcharging leads to a phenomenon known as gasing. Once an electrode of a battery has been fully reconstituted, charging beyond that point causes gases to be liberated by the electrodes at the expense of the electrolytes. In open or vented cells, these gases can escape, although some damage to the electrode will be caused as a result. However, a hermetically sealed battery suffers from a more acute problem as the gas pressure will build up in the battery, which could conceivably lead to an explosion. In all types of batteries, overcharging will cause at least excessive heating of the battery cell, as the extra charge which cannot be converted in to chemical energy is dissipated as heat. Thus, there is a need for a device which will allow batteries to reach their substantially full charge—meaning full charge on every cell within the battery—while not causing overcharge of the battery cells with the particular disadvantages associated therewith.

A particular proposed solution to this problem is discussed in Canadian Pat. No. 698,137. This patent teaches a plurality of diodes, each being connected in parallel across a cell of a battery in a forward biased direction. These diodes are specially constructed so that the forward voltage drop across the diode (necessary to forward bias it) is slightly greater than the cell voltage of the battery. Thus, when the battery is being charged, the diode shunting each particular cell will become conducting at such time as the battery cell voltage reaches a voltage high enough to forward bias the diode.

Another proposed solution is taught by U.S. Pat. No. 3,343,058. This patent teach using a tunnel diode device suitably shunted across each battery cell. When the battery reaches a breakdown voltage of the tunnel diode, the tunnel diode begins conducting, thus limiting the cell voltage similar to the diode in the Canadian patent.

However, the problem with both of these later two proposals is that there will be a necessary trade-off between charging current and the size of the semiconductor device being used. For any reasonable charging current the size of diode would have to be large enough to dissipate that entire amount of current, so that when a cell becomes fully charged the associated diode can conduct the remainder of the current around the fully charged cell. This would necessitate physically large components for any reasonable charging rate.

Another proposed solution to the problem involves using some kind of intelligent unit to sense the charge on a battery cell and having this unit cause switching units to switch around the particular battery cell according to a predetermined algorithm. This method is exemplified by U.S. Pat. No. 4,061,955 and U.S. Pat. No. 4,238,721. Both of these patents teach extremely complicated systems being used to monitor the cell voltage and a analog switch device capable of carrying the proper amount of current shunting around this cell at the proper time.

In stark contrast, according to the present invention, this shunting is done by a specially constructed zener diode. This operation of the present invention is extremely advantageous in high temperature battery cells, such as sodium sulfur. A sodium sulfur battery cell can be overcharged to a certain extent without significant deleterious effects occurring thereto. Also, the ambient temperature of the cell is already 350° C., the heating effects added by overcharging the cell can be negligible. However, although the present invention finds a great usefulness in high temperature batteries such as sodium sulfur, it is not intended to be limited to these kinds of batteries and would find many applications in low temperature batteries such as nickel cadmium and lead acid as well. Since the requirements of a high temperature battery make maintenance of the battery difficult, these devices are particularly cost justified in these high temperature batteries.

Thus it is an object of the present invention to overcome the problems stated above, by use of a specially constructed zener diode looping element for use in a battery with a plurality of cells, the looping element being used as a shunt across each said cell, which includes a zener diode p-n junction, packaged in a heavy duty package so that failure of the package will not occur during extreme overcurrent conditions. The zener diode fuses to a permanent short circuit condition when a predetermined amount of current is passed through the zener diode in a forward biased direction for a predetermined length of time.

A battery according the present invention includes: a plurality of battery cells connected in serial with a plurality of zener diode looping elements, each connected in parallel across each cell, each of the zener diode elements having its cathode connected to the anode of each cell and each zener diode having its anode connected to the cathode of each cell. The looping element is constructed so that when a predetermined amount of current is passed through it in a forward direction the zener diode fuses permanently into a short circuit state. The battery system can alternatively include terminals for relaying a voltage from the battery to a load; a plurality of battery cells connected in series betweens the terminals; a plurality of zener diodes, each zener diode being connected in parallel across one of the battery cells, so that the zener diode is normally reverse biased; and a charger for applying charge to the battery according to a predetermined program; the predetermined program ensuring that when the battery voltage is high enough to cause reverse breakdown of the zener diodes that the current emitted from the charger will not cause destruction of said zener diodes.

BRIEF DESCRIPTION OF THE DRAWINGS

Other objects and purposes of the present invention will be discussed with reference to the accompany drawings wherein.

DETAILED DESCRIPTION OF THE PREFERRED EMBODIMENTS

Figure 1:
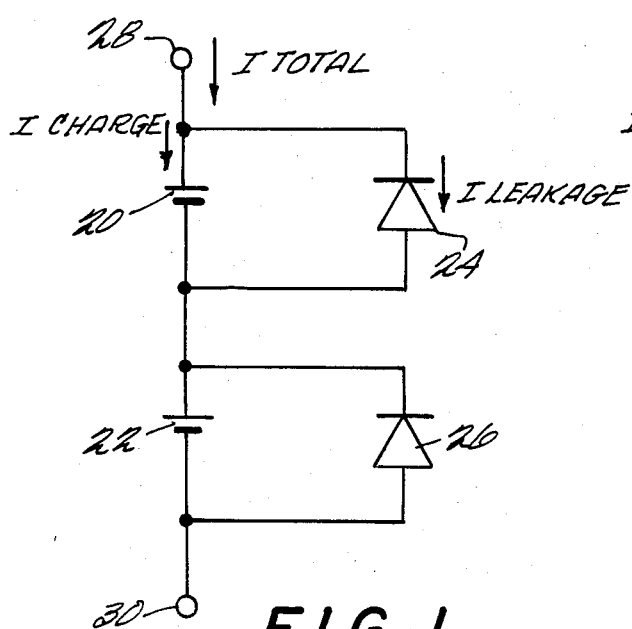
FIG. 1 shows a two-cell battery according to the present invention in a charging mode.

Referring to FIG. 1, a representative twocell battery according to the present invention, with two cells 20 and 22 is shown. Shunted across cell 20 is looping element 24 and shunted across cell 22 is looping element 26. The battery voltage for this battery is available at terminals 28 and 30. FIG. 1 shows this battery in the charging mode with a current of I total being applied at terminals 28 and 30. Of this I total current, a current of I charge is applied to each battery with a leakage current (the reverse leakage current of the associated looping element) conducting through each looping element in the reverse direction. The leakage current (I leakage) is typically on the order of magnitude of 0.5 MA.

Figure 2:
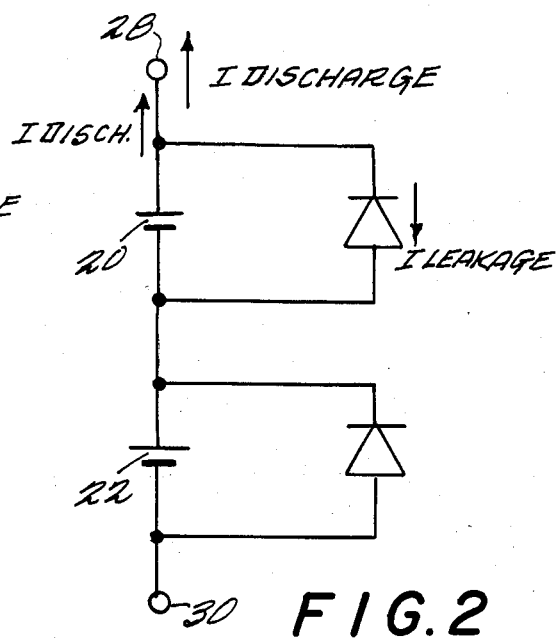
FIG. 2 shows a two-cell battery in a discharge mode.

FIG. 2 shows the same two-cell battery in a discharge mode. In this discharge mode, discharge current is available at terminals 28 and 30, and a similar leakage current passes through the reverse biased diode. This discharge current flows through both cells 20 and 22 in the cell string to be available at terminals 28 and 30.

Figure 3:
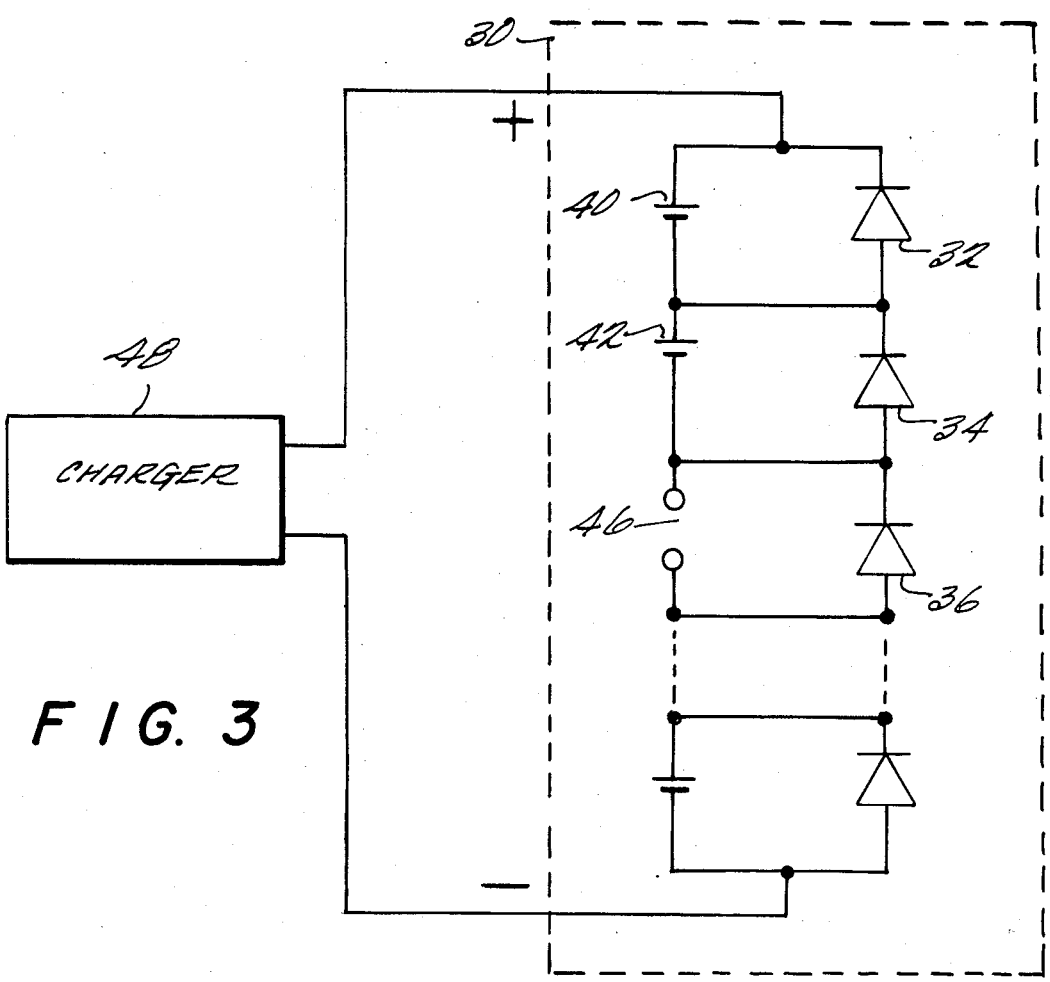
FIG. 3 shows a plurality of sodium sulfur cells connected in series in a charging circuit.

FIG. 3 shows a battery 30 according to the present embodiment with a plurality of looping elements shunted in parallel across each individual battery cell. The battery being used in the present embodiment is of the sodium sulfur type but could easily be any other type battery. Battery 30 has 24 cells—of which only four are shown in FIGS. 3 and 4.

Referring to FIG. 3, battery 30 has a plurality of cells, whereby each particular cell has a looping element shunted across it. For example, cell 40 is shunted by looping element 32. However, in battery 30, cell 46 has failed—and is thus shown as an open circuit. Obviously then, as shown in FIG. 3, cell 30 could not be charged by charger 48, as no complete charging path exists.

Figure 4:
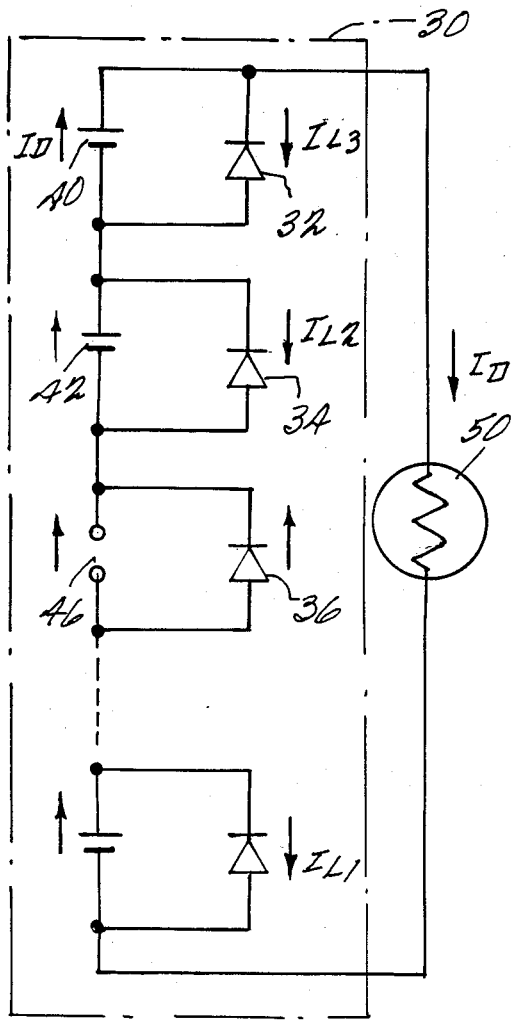
FIG. 4 shows the sodium sulfur cells connected to a load.

FIG. 4 shows the battery 30 being connected to a load 50. When connected to load 50, a current $I_D$ flows through load 50. Since battery cell 46 has been open circuited, this current will flow in a forward direction through looping element 36. Thus, the open circuit condition of cell 46 does not affect the integrity of the battery's operation in a discharge mode. This current $I_D$ also flows through cells 42 and 40. Each of cells 42 and 40 has a leakage current in the reverse direction through their associated looping element 34 and 32.

An explanation of the operation of looping element 36 follows.

Figure 5:
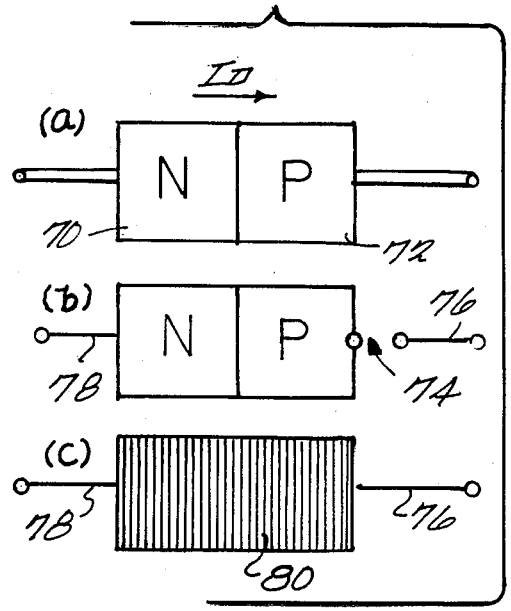
FIG. 5 shows the semiconductor layout of the looping element.

Referring to FIG. 5A, a typical semiconductor diode is shown. This diode has a current $I_D$ flowing in the direction shown, and thus is forward biased. The result of forward biasing a diode is well known to those skilled in the art, and thus the interaction of N-area 70 and P-area 72 will not be discussed herein. However, as a result of the current flow in the diode, a certain amount of this current is dissipated as heat. In the typical prior art semiconductor diode, as a result of excess heating of the diode, a packaging failure would occur, as shown diagrammatically in FIG. 5B. In FIG. 5B, the result of current flow through the P-N junction has caused excess heating. As a result of this, lead 76 has become dissociated from P-area 72 thereby forming a gap 74. Lead 78, however, is still attached to N-area 70.

Thus, the resultant effect of heat in a diode of the prior art is typically that package failure occurs as a result of the overcurrent condition, and thereby open circuits the device. Therefore, the device can no longer conduct current.

The effect of an overcurrent condition in the looping element of the present invention is shown in FIG. 5C. The inventors of the present invention have experimentally found that the inherent failure mode of a silicon diode is the short circuit state. However, in a conventional silicon diode, this inherent failure mode is not reached due to package failure prior to the short circuit state occurring. Therefore, the present invention uses a package which is specially constructed so that package failure will not occur due to an overcurrent condition. With the device constructed in this way, the result of an overcurrent condition is shown in FIG. 5C. In FIG. 5C leads 76 and 78 have remained affixed to silicon substrate 80. However, silicon substrate 80 has fused into a short circuit state. The mechanics of such fusing are not readily known to the inventors of the present invention, but have been observed experimentally to occur.

Figure 6:
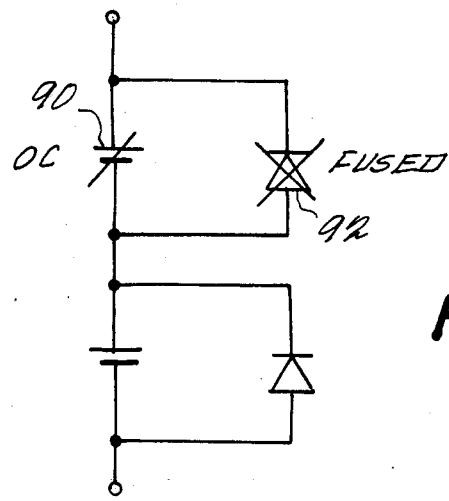
FIG. 6 shows the two-cell battery with the looping element fused into a permanently conducting state.

Referring to FIG. 6, the result of this open circuited battery cell is diagrammatically shown. Since cell 90 has become open circuited, the associated looping element 92 has become permanently fused, thereby effectively looping over the failed battery cell.

Figure 7:
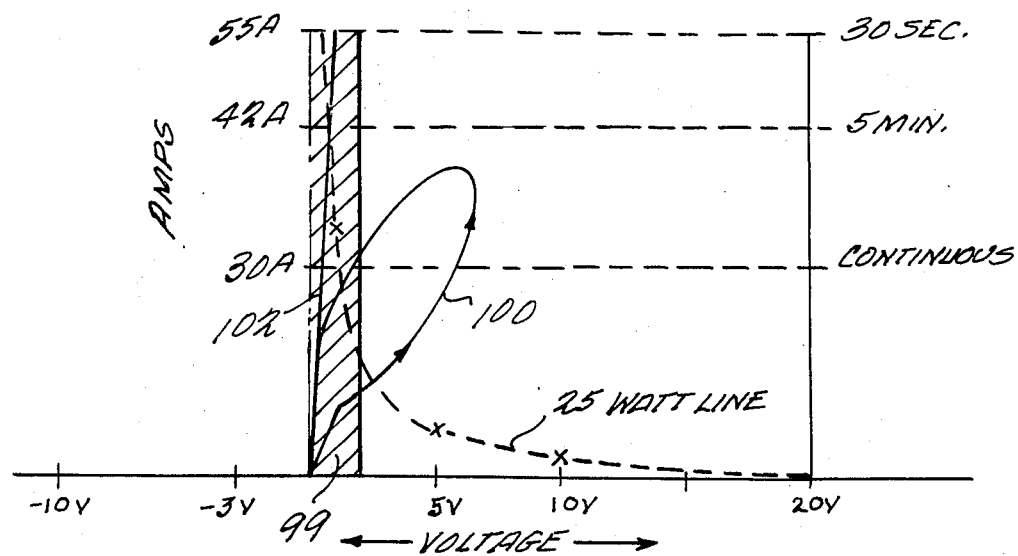
FIG. 7 shows an operating diagram showing the mode of changing the fusing state of the looping element.

Referring to FIG. 7, an operating diagram of the looping element is shown. This operating diagram shows the fused element in the hatched region 99. The amount of current to fuse the element, as a function of time necessary at the particular current is also shown. For example, with the particular looping element chosen, at 55 amperes forward current, the device is fused in 30 seconds. At 42 amperes, the fusing time is five minutes, and below 30 amperes fusing of the device will not occur. These current values are typical and were chosen with the sodium sulfur battery in mind. It is readily obvious to one of ordinary skill in the art that the fusing point could be chosen to be any current by suitably adjusting the characteristics of the silicon substrate being used, and thus any kind of battery could be accommodated by this looping element. Referring to FIG. 7, curve 100 is a typical path that the looping element might travel in transition to its fused state. The rising part of curve 100 represents the period during which the diode is forward biased conducting large amounts of current. When fusing begins to occur, the curve begins to dip downward eventually ending up in the hatched area which represents the operating area of the fused element. Line 102 represents a typical voltage current characteristic of a fused element. Thus, when the element forward conducts large amounts of the current, it will undergo a permanent state change. Once undergoing this permanent state change, the looping element will thereinafter act as a fusible link which has been fused.

Figure 8:
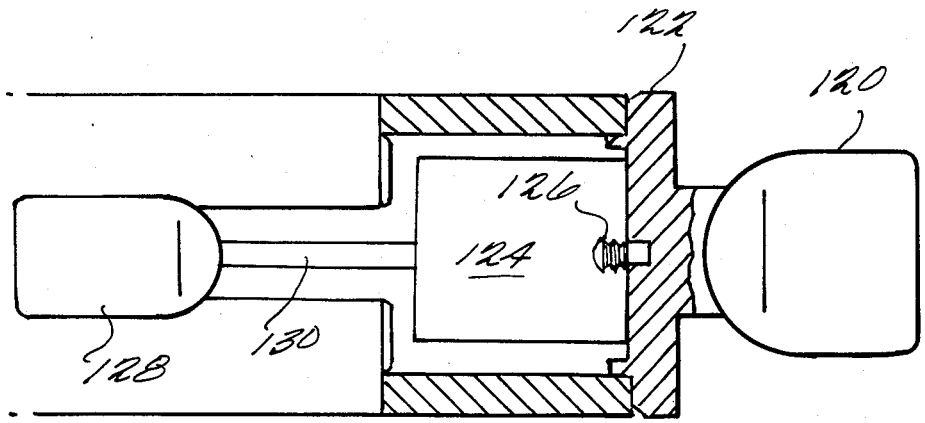
FIG. 8 shows a typical packaging which can be used for the looping element according to a first embodiment of the invention.

Referring to FIG. 8, a diagram of a possible packaging layout of the preferred embodiment of the looping element is shown. This looping element diode has a first terminal 120 attached to case 122. Case 122 is in physical contact with silicon diode 124. Therefore, the possibility of the lead dissociating during overcurrent condition is obviated. Alternatively, stud 126 can be threadably attached through casing 122 into silicon diode 124. This aids in effective contact between first terminal 120 and the silicon diode, and minimizes the possibility of lead dissociation. Second terminal 128 is not physically connected to the package (or else shorting across the package would occur) and is thus connected to silicon diode 124 by a heavy wire 130. This wire must be securely welded to both first terminal 128 and to silicon diode 124, and must be chosen so that it can safely conduct the entire short circuit current capacity of the particular battery being shorted across. For example, in the present embodiment, wire 130 must be capable of conducting the full short circuit current of a sodium sulfur battery, which can be as much as 100 amps. Thus, through proper construction, the integrity of the package of the looping element can be ensured, thus allowing it to function as a fusible link.

Figure 9:
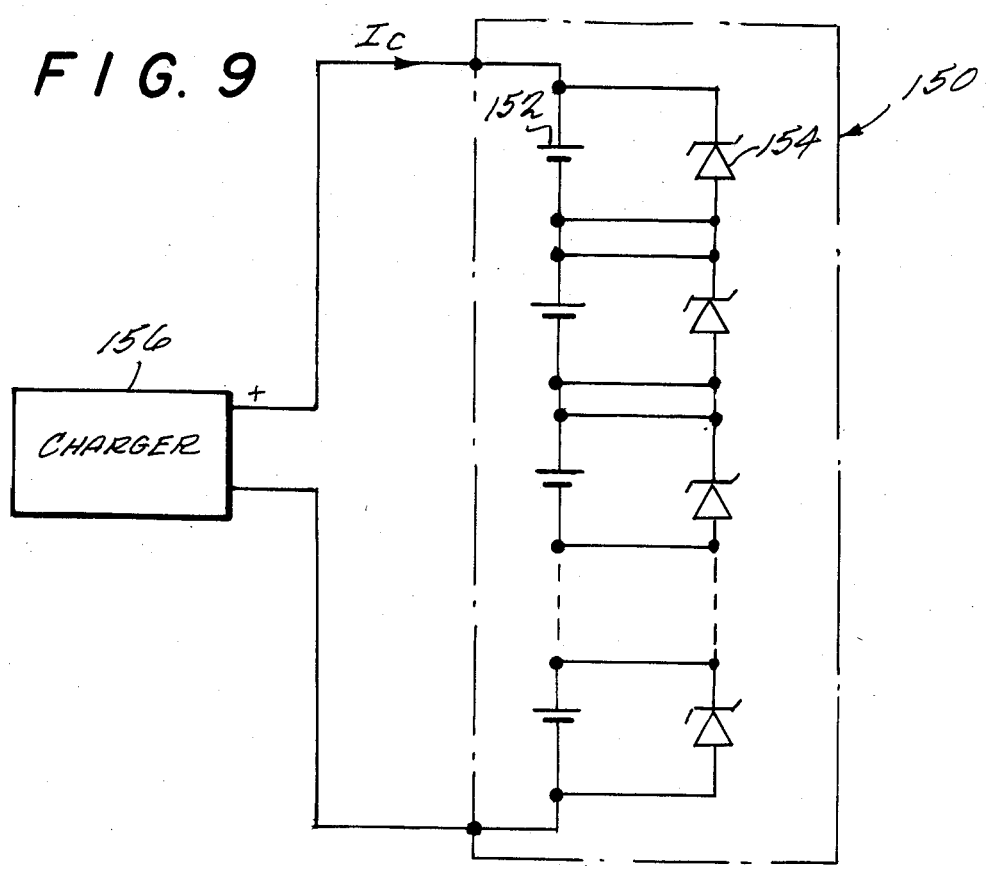
FIG. 9 shows a battery and charging circuit according to a second embodiment of the invention.

A second embodiment of the present invention will now be described with reference to FIG. 9. Referring to FIG. 9, a sodium sulfur battery 150 is shown with a plurality of cells 152 each of the plurality of cells having a zener diode 154 placed in reverse bias condition shunting this battery cell. Connected to battery 150 is charger 156 which supplies electrical charge to battery 150. This second embodiment operates as follows. During charging of a battery, some battery cells will naturally receive a greater proportion of the charge applied than others. These cells will thus charge quicker and will reach full charge before some of the other cells have reached full charge. Thus zener diodes 154 are chosen to have a reverse avalanche breakdown voltage which is substantially equal to the full charge voltage of battery cell 152. Therefore, when each battery cell 152 reaches substantially full voltage, each zener diode 154 will reach breakdown voltage, thereby effectively bypassing cell 152 and prevent it from receiving any more charge.

However, to implement a system such as described above, either the charging current $I_C$ would have to be extremely small, or zener diodes 154 would have to be extremely large to be able to handle the full charging current applied to the battery. According to this embodiment, charger 156 operates in a special way to allow a high charging current but small package size.

Figure 10:
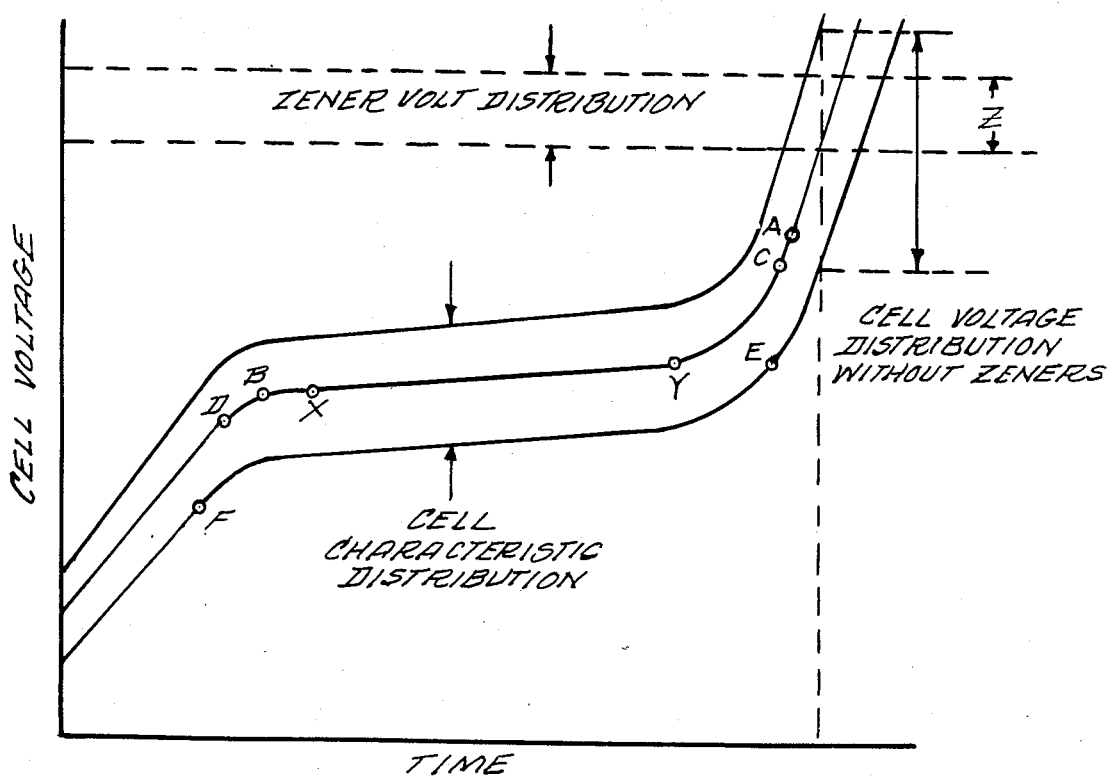
FIG. 10 shows a characteristic curve of operating limits for a sodium sulfur cell.

Referring to FIG. 10, a sodium sulfur cell's voltage versus time characteristic is graphically shown. Ideally, one cell in a string cycles between points A and B while other cells cycle between, for example, points C and D or E and F. In this ideal situation, the time interval and amp hours transferred between pairs of points are identical for all cells in the string as they oscillate between the same pair of points in consecutive cycles. In addition, leakage current across the battery due to cell defects, conductive paths across the exterior of the cells, insulation defects and through the bypass element cause all cells to move down the curve to some extent. As previously mentioned, this leakage rate is not the same for every cell. Thus, the various cells will attain different voltage characteristics. Merely charging all the cells at the same rate would bring these different cells to different points on the operating limit curve.

The present embodiment solves this problem by the use of zener limiting diodes. The result of these diodes being shunted across each cell (as in FIG. 9) is that all cells are charged to a voltage in the region Z of FIG. 10. A further advantage of a plurality of zener diodes, one across each cell, is that the final charge voltage across all batteries is predetermined to be the sum of all the zener voltages. When a charger senses this voltage, it must necessarily mean that the battery is at the highest possible charge limit it can attain.

Figure 11:
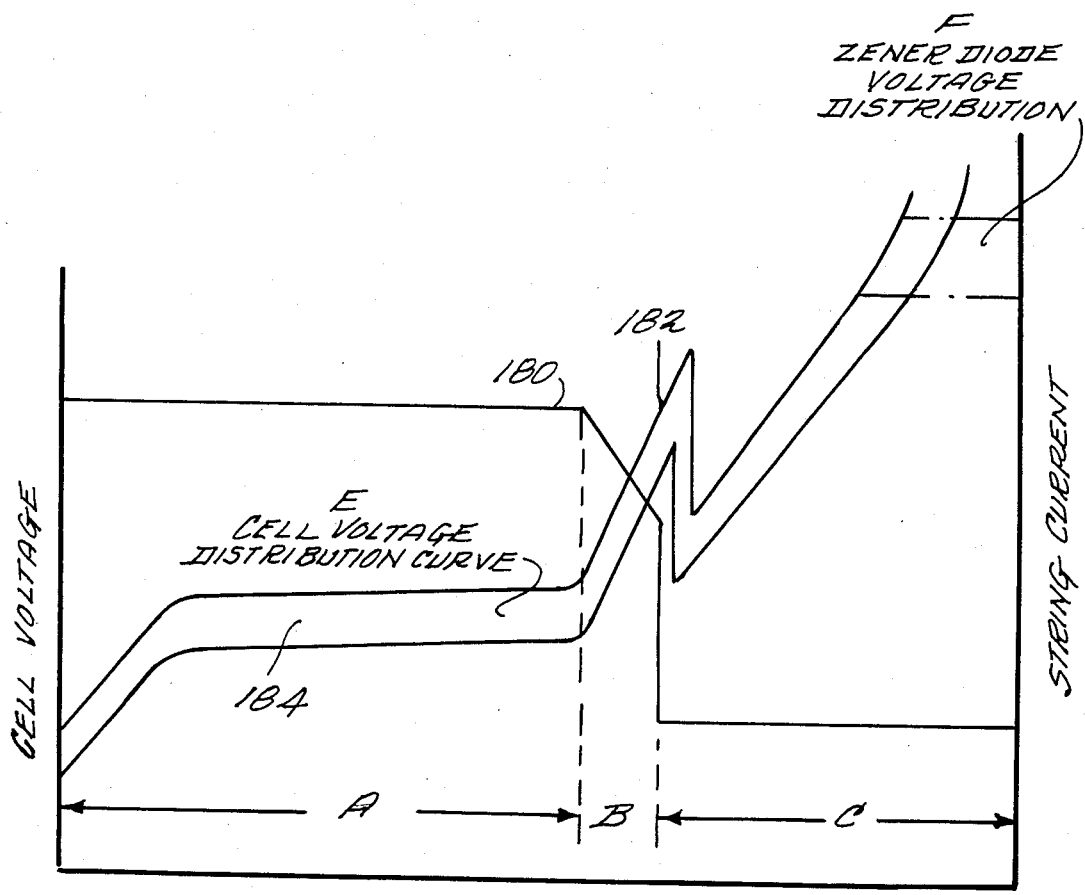
FIG. 11 describes the charging program used by the charger according to the present invention.

Referring to FIG. 11, the charging method used by the charger in the present embodiment is shown. Referring to FIG. 11, the charging rate is represented by curve 180. It can be seen that for a time period A, all the cells are charged at their maximum rate. After this time period A, a time period B follows during which the cell voltage would normally rapidly increase. To limit stresses in the cell during this period of large voltage increase, the charging current applied during this period is declined. At a voltage level represented by point 182, a switch to a low charging rate is effected. Voltage 182 is chosen to be a point sufficiently lower than the zener voltages chosen that a very high expectation of no zener voltage being reached will exist. Low charging current which is used during region C, is chosen to be low enough so that it will not damage the zener diodes when the zener diodes enter their breakdown mode. The decision when to switch between the regions is made by the charger on the basis of the string voltage (curve 184) and charge time.

A third embodiment of the invention uses the same zener diodes as shown in FIG. 9 with charger 156. However, zener diodes 154 perform the further function of being looping elements as described with respect to the first embodiment. Thus, these special zener diodes perform the dual function of (1) being looping elements, thereby permanently shorting out any open circuited cells and (2) equalizing cell voltages during charging.

Although only a few preferred embodiments have been described herein, it will be obvious to one of ordinary in the art that many modifications are possible. For instance, the batteries described could be any kind of battery including lithium fluoride, nickel cadmium, lead acid, or sodium sulfur as described. Accordingly, all such modifications are intended to be included in the following claims.

What is claimed is:

1. A battery system comprising:
   a plurality of battery cells, each having an anode and a cathode connected in series; and
   a plurality of zener diode looping elements, each connected in parallel across an associated one of said cells and each looping element including a zener diode p-n junction, and a package formed so that failure of the package will not occur during high current conditions, each said looping element having its cathode connected to the anode of each said cell and said looping element having its anode connected to the cathode of each said cell;
   said zener diode looping element being constructed so that when a predetermined amount of current is passed therethrough in a forward biasing direction, said p-n junction fuses permanently into a short circuit state, thereby shorting across said associated battery cell.

2. A system as in claim 1 wherein said battery is sodium sulfur.

3. A battery as in claim 1 wherein said battery is of the alkali/chalcogen type.

4. A battery as in claim 1 further comprising terminal means on said battery for coupling a voltage produced by said series connected cells to an outside source.

5. A battery as in claim 4 further comprising charging means for charging said battery according to a predetermined program.

6. A battery as in claim 5 wherein said charging means charges at three rates—a first high current rate, a second reducing current rate and a third low current rate.

7. A battery as in claim 1 wherein said predetermined amount of current is less than the expected output current of said battery.

8. A battery as in claim 1 wherein each said looping element has a zener voltage substantially equal to a full charge cell voltage of each said cell.

9. A battery system comprising:
terminal means for relaying a voltage from said battery to a load;
a plurality of battery cells connected in series between said terminal means;
a plurality of zener diodes, each said zener diode connected in parallel across each said battery cell, so that said zener diode is normally reverse biased; and
charging means for applying charge to said battery according to a predetermined program; said predetermined program controlling a current output of said charging means so that when said battery voltage is high enough to cause reverse breakdown of any of said zener diodes, the current emitted from said charging means will be low enough that said zener diodes will not be damaged.

10. a device as in claim 9 wherein said battery is of the sodium sulfur type.

11. A device as in claim 9 wherein said battery is of the alkali/chalcogen type.

12. A device as in claim 9, wherein said zener diodes are also zener diode looping elements, which in response to a predetermined forward bias current permanently fuse into a short circuit state, each said zener diode looping element including a p-n junction and a special package which will not fail during overcurrent conditions, a predetermined current causing said p-n junction to permanently fuse into a short circuit state.

13. A device as in claim 12 wherein the zener voltage of said zener diodes is chosen to be substantially equal to the cell voltage of said battery cells.

14. A device as in claim 13 wherein said charging means has three charging rates—a high current rate, a reducing current rate, and a low current rate, said low current rate being lower than the current handling capacity of said zener diodes.

15. A device as in claim 9 further comprising looping element means in parallel across said zener diode means for shorting out any failed cells.

16. A battery comprising:
a plurality of battery cells; and
a plurality of zener diode looping elements, each cell having a zener diode looping element coupled in parallel therewith so that a cathode of said looping element is coupled to a positive terminal of the battery cell, each said looping element including a zener diode chip packaged so that package failure will not occur during overcurrent conditions, and formed so that a forward current of the battery flowing in a forward direction through said looping element causes said zener diode chip element to permanently fuse into a short circuit state.

17. A battery as in claim 16 wherein said looping element package includes a case, in physical contact with said zener diode chip.

18. A battery as in claim 16 wherein a breakdown voltage of said zener diode looping element is substantially equivalent to a fully charged cell voltage of said cell.

19. A battery as in claim 18 further comprising means for charging said battery.

20. Apparatus as in claim 19 wherein said charging means includes means for charging at a maximum rate, and means for charging at a second rate lower than said maximum rate, and lower than a maximum-rated reverse breakdown current of said zener diode looping elements.

21. Apparatus as in claim 20 wherein said charging means includes means for detecting a voltage substantially equal to a sum of all of the breakdown voltages of said looping elements added together, and for stopping said charging when said sum is detected.

* * * * *